Patented Feb. 16, 1932

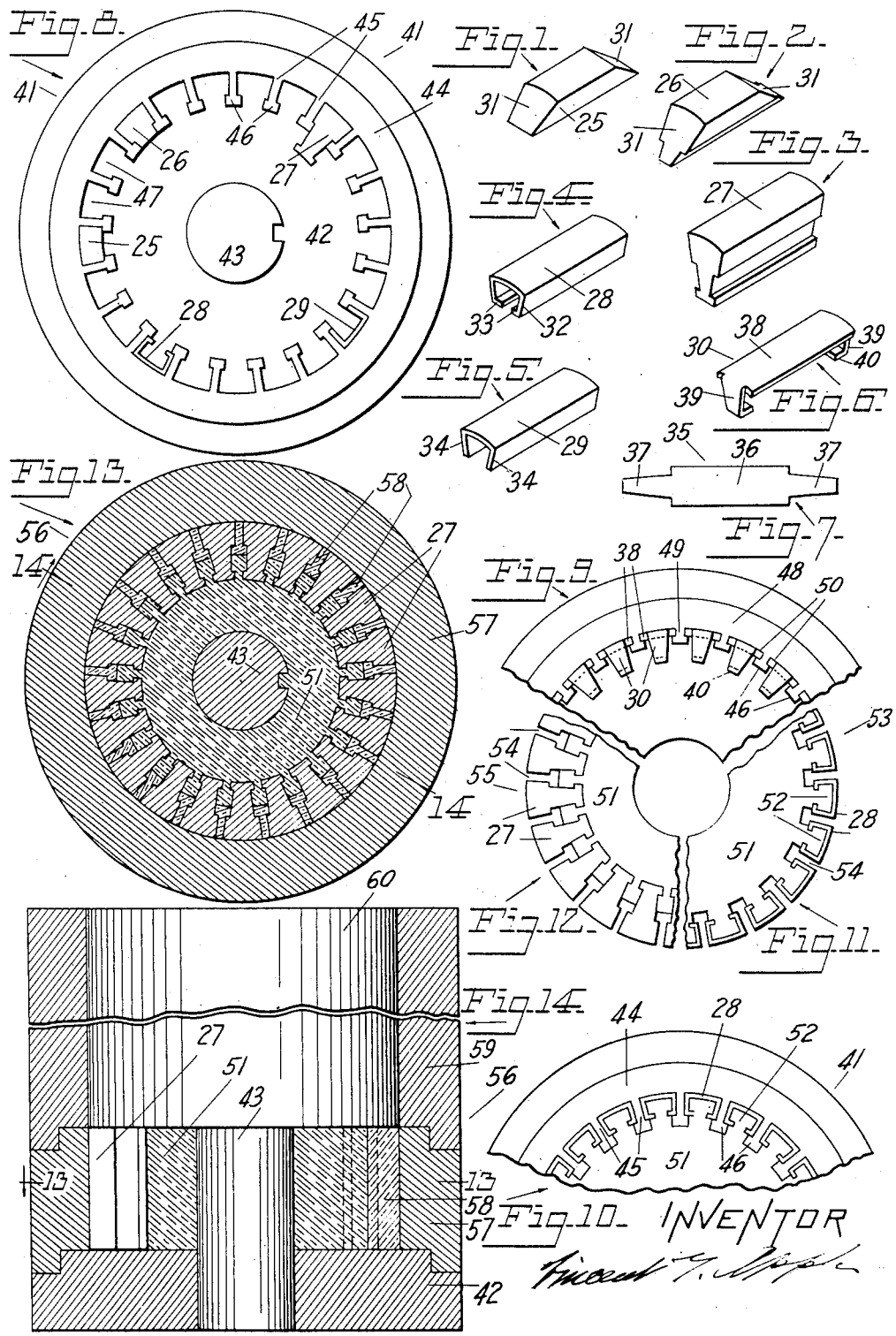

1,845,115

UNITED STATES PATENT OFFICE

VINCENT G. APPLE, OF DAYTON, OHIO

COMMUTATOR

Application filed July 26, 1929. Serial No. 381,360.

This invention relates to commutators and particularly to that class of commutators wherein a plurality of segments of material having a high degree of electrical conductivity are bound together in spaced apart relation by a core of insulation molded in situ between and about them.

To provide commutators of this class suitable for high rotative speed the core material must possess considerable mechanical as well as dielectric strength, and a certain class of phenol-resin molding compounds meet this requirement and are therefore often used for this purpose.

But when cores made from these strong materials extend outwardly between the metal segments and form a part of the brush track of the commutator, difficulty is encountered, since these materials do not make a good brush track because arcing of the brushes converts them to carbon which is a conductor, and thereby adjacent segments are electrically joined.

To overcome this objection commutators of this class are usually undercut, i. e. the core material is cut from between the segments at the brush track, or sometimes spacers of sheet insulating material more nearly suited to a brush track are placed between the segments near the periphery of the commutator, and the core is then molded to extend outwardly between the segments until met and excluded by these spacers.

It is therefore an object of this invention to produce a commutator in which these objections are not present, by providing apparatus and a procedure which contemplates employing one kind of insulation for the core and another kind for the spacers which separate the segments at their outer edges adjacent the brush track, each kind being determined by its adaptability to its particular function, and placing each where its particular kind is needed.

Since some materials which are highly suitable for the segment spacers lack the necessary adhesive properties to keep them secured against radially outward movement during rotation of the commutator, it is a further object of the invention to provide specific means to hold them in place.

Other objects and meritorious features of the invention will become apparent, to one skilled in the art of commutator making, from a consideration of the following description taken in conjunction with the drawings, wherein—

Figs. 1 to 6 are perspective views of different forms of segments, either of which is suitable for making a commutator embodying my invention.

Fig. 7 is an outline of the blank from which the segment shown in Fig. 6 is made.

Fig. 8 is a plan view of the mold with the stock ring and the plunger removed to more clearly show the means for holding a plurality of segments, of either of the kinds shown in Figs. 1 to 5, in spaced apart relation while a core of insulation is molded in place.

Fig. 9 is a fragmentary plan view of another mold similar to that shown in Fig. 15 but modified to hold a set of segments Fig. 6.

Fig. 10 is a fragmentary view of the mold Fig. 8 with segments Fig. 4 in place between the spacing means of the mold, and a core of insulation molded to hold the segments in spaced relation after the structure is removed from the mold.

Fig. 11 shows the commutator structure as it appears after removal from the mold in which it appears in Fig. 10.

Fig. 12 shows a commutator structure similar to that shown in Fig. 11 except that it is composed of segments Fig. 3 instead of segments Fig. 4.

Fig. 13 is a transverse section through a second mold similar to that shown in Fig. 8 except that the segment spacing means are omitted.

Fig. 14 is a vertical axial section through the second mold taken at 14—14 of Fig. 13.

Similar numerals refer to similar parts throughout the several views.

Segments 25, 26 or 27 are preferably made by providing bar stock or wire of the cross section shown and cutting it into lengths. The segments 25 and 26, having no grooves

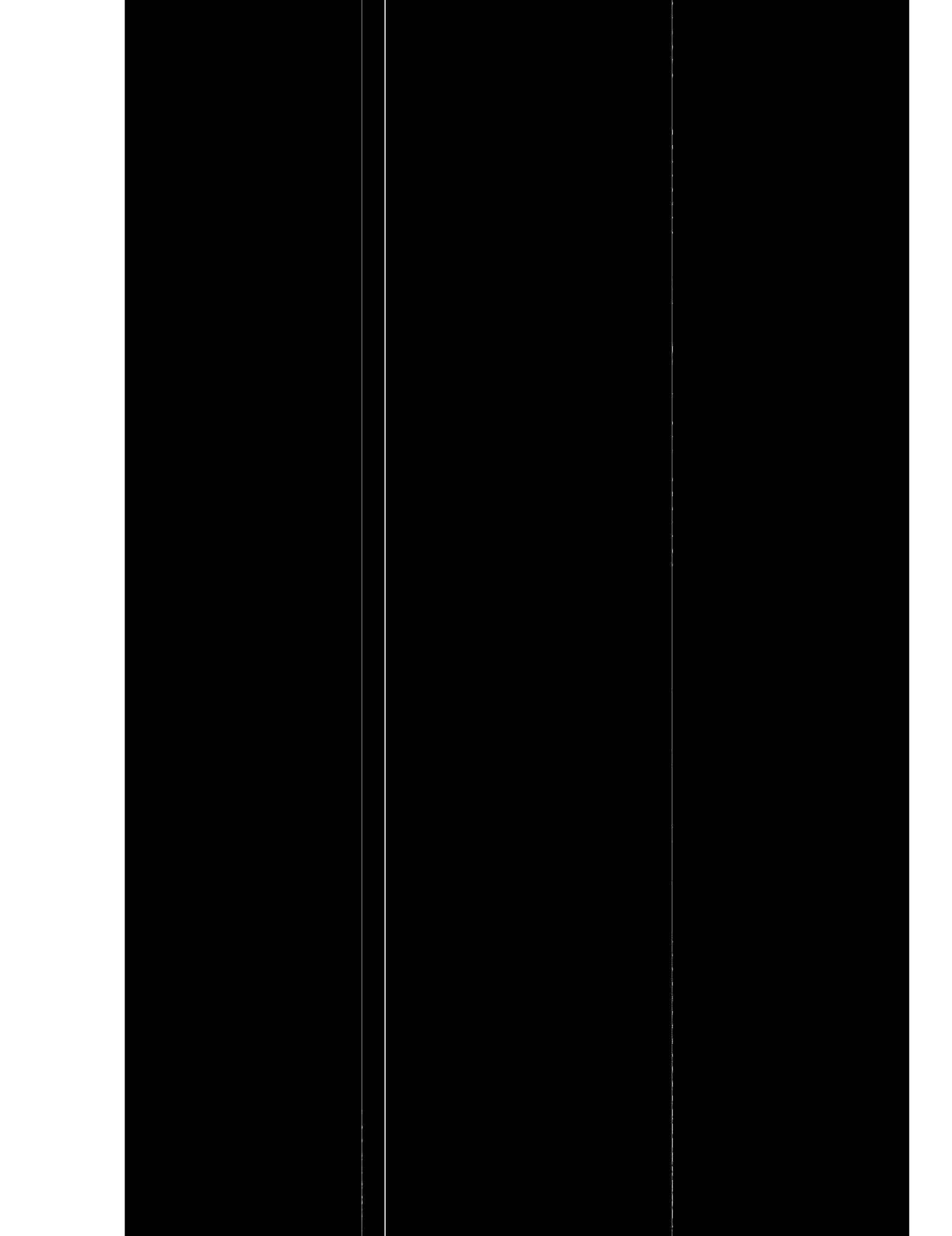

which consists of supporting the segments against circumferential movement in a mold by partitions extending radially inward from the inner wall of said mold, and against radial movement by enlargements at the inner ends of said partitions, molding a core of insulation about certain portions of said segments to bind them together in the spaced apart relation which they occupy in the mold due to said partitions, removing the partitions so as to form slots having enlarged bottoms, then molding insulation of a different nature than that in said core into the said slots.

3. The method of making a commutator, which consists of arranging the segments in spaced apart cylindrical formation, supporting them against circumferential movement in a mold by partitions extending radially inward from the wall of said mold, and supporting them against radially inward movement in said mold by T-shaped inner ends on said partitions, molding a core of insulation about said segments, hardening said core, removing said spacers so as to form T-shaped slots, then molding insulation into said slots.

In testimony whereof I affix my signature.

VINCENT G. APPLE.